United States Patent
Davis et al.

(10) Patent No.: US 11,083,293 B2
(45) Date of Patent: Aug. 10, 2021

(54) MODULAR STACKABLE SHELVES

(71) Applicants: Clark Davis, Provo, UT (US); Paul Schmidt, Lehi, UT (US)

(72) Inventors: Clark Davis, Provo, UT (US); Paul Schmidt, Lehi, UT (US)

(*) Notice: Subject to any disclaimer, the term of this patent is extended or adjusted under 35 U.S.C. 154(b) by 0 days.

(21) Appl. No.: 16/656,299

(22) Filed: Oct. 17, 2019

(65) Prior Publication Data
US 2021/0112980 A1 Apr. 22, 2021

(51) Int. Cl.
*A47B 87/02* (2006.01)
*A47B 47/00* (2006.01)

(52) U.S. Cl.
CPC ...... *A47B 87/0223* (2013.01); *A47B 47/0083* (2013.01); *A47B 47/0091* (2013.01)

(58) Field of Classification Search
CPC ............ A47B 87/0223; A47B 47/0083; A47B 47/0091; A47B 47/024; A47B 47/045
See application file for complete search history.

(56) References Cited

U.S. PATENT DOCUMENTS

| | | | |
|---|---|---|---|
| 919,257 A | 4/1909 | Seydewitz | |
| 981,532 A | 1/1911 | Cary | |
| 1,061,297 A | 5/1913 | Johnson | |
| 1,419,647 A | 6/1922 | Shepherdson | |
| 1,431,823 A * | 10/1922 | Georges | A47B 87/0215 108/190 |
| 1,747,900 A | 2/1930 | Jenny | |
| 1,903,631 A | 4/1933 | Morrison | |
| 1,940,117 A | 12/1933 | Carpos | |
| 1,981,646 A * | 11/1934 | Hamley | G09B 23/04 434/211 |
| 2,240,256 A | 4/1941 | Elmendorf | |
| 2,279,864 A | 4/1942 | Eide | |
| 2,334,912 A | 11/1943 | Eide | |
| 2,369,930 A | 2/1945 | Wagner | |
| D144,730 S | 5/1946 | Perrault | |
| 2,418,731 A | 4/1947 | Seitz | |
| 2,479,086 A | 8/1949 | Silverman | |
| 2,481,671 A | 9/1949 | John et al. | |

(Continued)

FOREIGN PATENT DOCUMENTS

| | | | | |
|---|---|---|---|---|
| CA | 1255355 A | * | 6/1989 | ......... A47B 87/0223 |
| CH | 281702 A | * | 3/1952 | ......... A47B 87/0223 |

(Continued)

OTHER PUBLICATIONS

Celery Rocking Chair viewed at http://www.eroomservice.com/manufacturer/celery/ circa Mar. 12, 2011.

(Continued)

*Primary Examiner* — Stanton L Krycinski
(74) *Attorney, Agent, or Firm* — Pate Peterson PLLC; Brett Peterson (57) ABSTRACT

A modular shelving unit includes a plurality of shelves supported by supports. Non-linear attachment pins are attached to the top of a lower shelf and received in upper supports which support an upper shelf. The attachment pins are bent so that they are wider than holes in the upper supports; bending the attachment pins elastically and maintaining them elastically bent when the shelving unit is in an assembled state.

24 Claims, 5 Drawing Sheets

(56) References Cited

U.S. PATENT DOCUMENTS

| | | | |
|---|---|---|---|
| 2,486,987 A | 11/1949 | Scarlett | |
| 2,518,955 A | 8/1950 | Stelzer | |
| 2,534,413 A | 12/1950 | Cenis | |
| 2,551,071 A | 5/1951 | Tyncs | |
| D164,552 S | 9/1951 | Curtis | |
| 2,595,002 A | 4/1952 | Schneider | |
| 2,602,012 A | 7/1952 | Doty | |
| 2,615,771 A | 10/1952 | Curtis | |
| 2,632,498 A | 3/1953 | Curtis | |
| 2,672,181 A | 3/1954 | Rose | |
| 2,677,491 A | 5/1954 | Burger | |
| 2,703,724 A * | 3/1955 | Der Yuen | F16B 7/182 403/265 |
| 2,720,253 A | 10/1955 | Turner | |
| 2,745,591 A | 5/1956 | Holt | |
| 2,786,789 A | 3/1957 | Carlson | |
| 2,792,877 A | 5/1957 | West | |
| 2,801,895 A | 8/1957 | Gass | |
| 2,825,101 A | 3/1958 | Rubsnstein | |
| 3,053,598 A | 9/1962 | Cheslow | |
| 3,089,675 A | 5/1963 | Lozier | |
| 3,149,880 A | 9/1964 | Steuer | |
| 3,186,027 A | 6/1965 | Merillat | |
| 3,262,405 A | 7/1966 | Sutton | |
| 3,300,170 A | 1/1967 | Charles | |
| 3,300,245 A | 1/1967 | Rumble | |
| D212,601 S | 11/1968 | Rubsnstein | |
| 3,527,497 A | 9/1970 | Self | |
| 3,547,491 A | 12/1970 | Bovasso | |
| 3,578,385 A | 5/1971 | Stiglitz | |
| 3,603,274 A | 9/1971 | Ferdinand | |
| 3,603,656 A | 9/1971 | Ferman | |
| 3,636,893 A * | 1/1972 | Lange | A47B 47/0091 108/190 |
| 3,674,328 A | 7/1972 | White et al. | |
| 3,684,285 A * | 8/1972 | Kane | A63F 3/00214 273/241 |
| 3,697,363 A | 10/1972 | Martinez | |
| 3,783,801 A * | 1/1974 | Engman | A47B 87/0215 108/60 |
| 3,788,700 A | 1/1974 | Wartes | |
| 3,812,977 A | 5/1974 | Glassman | |
| 3,831,533 A * | 8/1974 | Kellogg | A47B 87/0215 108/64 |
| 3,847,435 A | 11/1974 | Skinner | |
| 4,021,128 A * | 5/1977 | Chiames | A47B 87/0223 403/217 |
| 4,055,924 A | 11/1977 | Beaver | |
| D247,596 S | 3/1978 | Osamu | |
| 4,082,356 A | 4/1978 | Johnson | |
| 4,099,472 A * | 7/1978 | Kellogg | A47B 87/0246 108/101 |
| 4,103,818 A | 8/1978 | Raubenheimer | |
| 4,140,065 A | 2/1979 | Chacon | |
| 4,153,311 A | 5/1979 | Takhasaki | |
| 4,158,277 A | 6/1979 | Krempp et al. | |
| 4,188,067 A | 2/1980 | Elmer | |
| 4,191,113 A | 3/1980 | Hogberg | |
| 4,202,581 A | 5/1980 | Fleishman | |
| 4,225,180 A | 9/1980 | Gillis | |
| 4,258,464 A | 3/1981 | Ullman | |
| 4,348,052 A | 9/1982 | Roland | |
| 4,390,204 A | 6/1983 | Fleishman | |
| 4,419,028 A | 12/1983 | Roland | |
| 4,433,753 A | 2/1984 | Watson | |
| 4,433,843 A | 2/1984 | Bricco | |
| 4,492,332 A | 1/1985 | Collins | |
| 4,501,512 A * | 2/1985 | Hiltz | F16B 12/18 403/170 |
| 4,509,794 A | 4/1985 | Roland | |
| 4,533,174 A | 8/1985 | Fleishman | |
| 4,544,092 A | 10/1985 | Palmer | |
| 4,548,350 A | 10/1985 | Engle | |
| 4,574,917 A | 3/1986 | Stoddard | |
| 4,591,090 A | 5/1986 | Collins | |
| 4,593,950 A | 6/1986 | Vittorio | |
| 4,595,105 A | 6/1986 | Gold | |
| D289,234 S | 4/1987 | Hoult | |
| 4,685,609 A | 8/1987 | Ferrari | |
| 4,706,573 A * | 11/1987 | Sielaff | F16B 12/18 108/190 |
| 4,712,837 A | 12/1987 | Swilley | |
| 4,759,449 A | 7/1988 | Gold | |
| D299,087 S | 12/1988 | Bruce | |
| 4,841,878 A | 6/1989 | Kriegsman | |
| D302,216 S | 7/1989 | Roland | |
| 4,846,530 A | 7/1989 | Noble | |
| 4,867,327 A | 9/1989 | Roland | |
| 4,878,439 A | 11/1989 | Samson | |
| 4,884,420 A * | 12/1989 | Finkel | E05B 73/0082 70/58 |
| 4,900,276 A * | 2/1990 | Doutrich | H05K 3/308 439/751 |
| 4,926,759 A | 5/1990 | Vitsky et al. | |
| 4,934,765 A | 6/1990 | Slifer | |
| 5,011,228 A | 4/1991 | Marcantel | |
| 5,069,144 A | 12/1991 | Williford | |
| 5,082,329 A | 1/1992 | Mars | |
| 5,253,594 A * | 10/1993 | Sideris | A47B 49/004 108/94 |
| 5,253,595 A | 10/1993 | Heidmann | |
| 5,263,766 A | 11/1993 | McCullough | |
| 5,275,467 A | 1/1994 | Kawecki | |
| 5,343,816 A * | 9/1994 | Sideris | A47B 49/004 108/94 |
| 5,354,589 A | 10/1994 | Waas | |
| 5,367,964 A | 11/1994 | Hockensmith | |
| 5,387,027 A | 2/1995 | Maloney | |
| 5,454,331 A | 10/1995 | Green | |
| 5,605,378 A | 2/1997 | Oyediran | |
| 5,613,449 A | 3/1997 | Pullman | |
| 5,644,995 A | 7/1997 | Gurwell et al. | |
| 5,655,812 A | 8/1997 | Albecker | |
| 5,706,741 A * | 1/1998 | Thorp | A47B 47/05 108/153.1 |
| 5,720,537 A | 2/1998 | Lutz | |
| 5,752,611 A * | 5/1998 | Nakagawa | A47B 87/0223 211/186 |
| 5,765,922 A | 6/1998 | Hsia | |
| 5,803,548 A | 9/1998 | Battle | |
| 5,803,561 A | 9/1998 | Puehlhorn | |
| 5,881,653 A * | 3/1999 | Pfister | A47B 87/0223 108/147.13 |
| 5,901,521 A | 5/1999 | Guy | |
| 5,921,631 A | 7/1999 | Bush | |
| 5,927,816 A | 7/1999 | Hsu | |
| 5,941,377 A | 8/1999 | Hart | |
| 5,992,938 A | 11/1999 | Jones | |
| 6,029,584 A * | 2/2000 | Cochrane | A47B 13/02 108/101 |
| 6,036,270 A | 3/2000 | Bufalini | |
| 6,041,920 A | 3/2000 | Hart | |
| D422,799 S | 4/2000 | Dworshak et al. | |
| 6,053,585 A | 4/2000 | Osen | |
| 6,109,695 A | 8/2000 | Kahwaji | |
| 6,126,022 A | 10/2000 | Merkel | |
| 6,155,641 A | 12/2000 | Frost | |
| 6,174,116 B1 | 1/2001 | Brand | |
| 6,189,974 B1 | 2/2001 | Beck | |
| 6,247,754 B1 | 6/2001 | Vanderaue et al. | |
| 6,283,564 B1 | 9/2001 | Corson | |
| 6,347,772 B1 | 2/2002 | L'Hotel | |
| 6,378,707 B1 | 4/2002 | Taggert | |
| 6,443,076 B1 | 9/2002 | Case | |
| 6,532,878 B2 | 3/2003 | Tidemann | |
| 6,595,378 B2 | 7/2003 | Wang | |
| 6,615,746 B2 | 9/2003 | Bart | |
| 6,615,999 B1 | 9/2003 | Culp | |
| 6,619,749 B2 | 9/2003 | Willy | |
| 6,675,979 B2 | 1/2004 | Taylor | |
| 6,769,369 B1 | 8/2004 | Brandenberg | |
| 6,807,912 B2 | 10/2004 | Willy | |

(56) References Cited

U.S. PATENT DOCUMENTS

| | | | |
|---|---|---|---|
| D499,577 S | 12/2004 | Willy | |
| 6,845,871 B1 | 1/2005 | Culp | |
| 6,848,747 B1 | 2/2005 | Robinson | |
| 6,895,870 B1 * | 5/2005 | Bizlewicz | F16F 15/02 108/91 |
| 6,955,401 B1 | 10/2005 | Shoulberg | |
| 7,066,548 B2 | 6/2006 | Butler | |
| 7,114,300 B1 | 10/2006 | Culp | |
| 7,168,766 B2 | 1/2007 | Pelletier | |
| 7,219,962 B2 | 5/2007 | Stone | |
| D547,076 S | 7/2007 | Hughes et al. | |
| 7,255,403 B2 | 8/2007 | Butler | |
| 7,300,110 B1 | 11/2007 | Debien | |
| 7,386,960 B2 * | 6/2008 | Molteni | E04B 2/7433 160/135 |
| 7,533,940 B1 | 5/2009 | Zook | |
| 7,631,605 B2 | 12/2009 | Willy | |
| 7,765,942 B2 * | 8/2010 | Choi | A47B 47/04 108/147.16 |
| 7,856,772 B1 | 12/2010 | Culp et al. | |
| 8,123,311 B2 * | 2/2012 | Nilsson | A47B 47/0083 312/108 |
| 8,167,377 B2 | 5/2012 | Kovach | |
| 8,215,245 B2 * | 7/2012 | Morrison | F16F 15/08 108/91 |
| 8,220,399 B2 | 7/2012 | Berent et al. | |
| 8,332,917 B2 | 12/2012 | Forster et al. | |
| 8,459,476 B2 * | 6/2013 | Malekmadani | A47B 87/0223 211/134 |
| 8,528,979 B2 | 9/2013 | College | |
| 8,590,976 B2 | 11/2013 | Davis | |
| 8,667,911 B2 | 3/2014 | Brandenberg | |
| 9,277,814 B2 | 3/2016 | Winker | |
| 9,282,819 B2 * | 3/2016 | Blake | A47B 87/002 |
| 9,447,804 B2 | 9/2016 | Andersson | |
| 9,534,623 B2 | 1/2017 | Anderson et al. | |
| 9,615,663 B2 | 4/2017 | Davis | |
| 9,706,836 B1 * | 7/2017 | Nelson | A47F 5/10 |
| 10,138,917 B2 | 11/2018 | Koch | |
| 10,227,162 B2 | 3/2019 | Davis | |
| 10,415,612 B2 | 9/2019 | Davis | |
| 2003/0107255 A1 | 6/2003 | Willy | |
| 2004/0056526 A1 | 3/2004 | Willy | |
| 2004/0227041 A1 | 11/2004 | Lewis | |
| 2007/0187348 A1 * | 8/2007 | Malekmadani | A47B 87/0223 211/186 |
| 2008/0074013 A1 | 3/2008 | Ahlgrim et al. | |
| 2008/0302748 A1 * | 12/2008 | Tsai | A47B 45/00 211/188 |
| 2009/0066140 A1 | 3/2009 | Berent et al. | |
| 2009/0084740 A1 * | 4/2009 | Lin | A47B 87/0223 211/41.14 |
| 2010/0003077 A1 | 1/2010 | Kelley | |
| 2012/0080910 A1 | 4/2012 | Davis | |
| 2013/0062294 A1 | 3/2013 | Beaty | |
| 2013/0080286 A1 | 3/2013 | Rotholz | |
| 2013/0170904 A1 | 7/2013 | Cappelle | |
| 2014/0048176 A1 | 2/2014 | Susnjara | |
| 2014/0048177 A1 | 2/2014 | Susnjara | |
| 2014/0059829 A1 | 3/2014 | Weber | |
| 2014/0263130 A1 | 9/2014 | Davis | |
| 2015/0335155 A1 | 11/2015 | Winker | |
| 2017/0023043 A1 | 1/2017 | Koelling et al. | |
| 2017/0079426 A1 | 3/2017 | Davis | |
| 2017/0086578 A1 | 3/2017 | Nowak | |
| 2017/0099961 A1 | 4/2017 | Church | |
| 2018/0112696 A1 | 4/2018 | Davis | |
| 2019/0038023 A1 | 2/2019 | Stocker | |
| 2019/0040890 A1 | 2/2019 | Davis | |
| 2019/0059593 A1 | 2/2019 | Davis | |
| 2019/0059594 A1 | 2/2019 | Davis | |
| 2019/0085886 A1 | 3/2019 | Davis | |
| 2019/0107131 A1 | 4/2019 | Davis | |
| 2019/0254424 A1 * | 8/2019 | Rassat | A47B 96/1416 |

FOREIGN PATENT DOCUMENTS

| | | | |
|---|---|---|---|
| DE | 1529719 | 5/1969 | |
| DE | 2100168 A1 * | 11/1972 | A47B 87/0223 |
| DE | 3925302 | 2/1991 | |
| DE | 9201692 U1 * | 4/1992 | F16B 12/24 |
| DE | 29914896 U1 * | 12/1999 | A47B 87/0223 |
| DE | 29906711 U1 * | 1/2000 | A47B 87/0223 |
| DE | 102007058662 | 6/2009 | |
| DE | 102014006155 A1 * | 10/2014 | A47B 87/0223 |
| EP | 0299695 A1 * | 1/1989 | A47B 87/0223 |
| FR | 1300853 A * | 8/1962 | A47B 87/0223 |
| FR | 2634991 A3 * | 2/1990 | A47B 87/0223 |
| FR | 2654164 A1 * | 5/1991 | A47B 87/0223 |
| GB | 143840 A * | 12/1920 | A47B 87/0223 |
| GB | 810752 A * | 3/1959 | A47B 47/0083 |
| GB | 2353080 | 2/2001 | |
| NL | 1025719 | 9/2005 | |
| WO | WO 2005-085656 | 9/2005 | |

OTHER PUBLICATIONS

PlyGrid Shelves viewed at http://offi.com/products/offikids/PLYGRID.php?p2c=249 circa Mar. 12, 2011.

Snap Table viewed at http://www.offi.com/pdfs/snaptable.pdf circa Mar. 12, 2011.

Furniture viewed at http://www.playatech.com/product_list.php circa Mar. 12, 2011.

Arabic Table viewed at http://www.plydea.com/support/assemblypdf.html circa Mar. 12, 2011.

Blue7Chair viewed at http://www.plydea.com/support/assemblypdf.html circa Mar. 12, 2011.

First Desk viewed at http://www.plydea.com/support/assemblypdf.html circa Mar. 12, 2011.

Rinaldo Chair viewed at http://www.plydea.com/support/assemblypdf.html circa Mar. 12, 2011.

Tuffet Stool viewed at http://www.plydea.com/support/assemblypdf.html circa Mar. 12, 2011.

WasteNot Basket viewed at http://www.plydea.com/support/assemblypdf.html circa Mar. 12, 2011.

Winehold Wine Rack viewed at http://www.plydea.com/support/assemblypdf.html circa Mar. 12, 2011.

* cited by examiner

MODULAR STACKABLE SHELVES

THE FIELD OF THE INVENTION

The present invention relates to modular shelving. In particular, examples of the present invention relates to a system of stackable shelves.

BACKGROUND

Many persons desire modular furnishings which may be assembled as needed or which may be customized to meet the particular needs of the person. There is also increasing demand for more natural home furnishings, such as furniture which is made from wood instead of plastic or metal.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

As used herein, "adjacent" refers to near or close sufficient to achieve a desired effect. Although direct contact is common, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a number or numerical range endpoint by providing that a given value may be "a little above" or "a little below" the number or endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Dimensions, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

Figure 1:
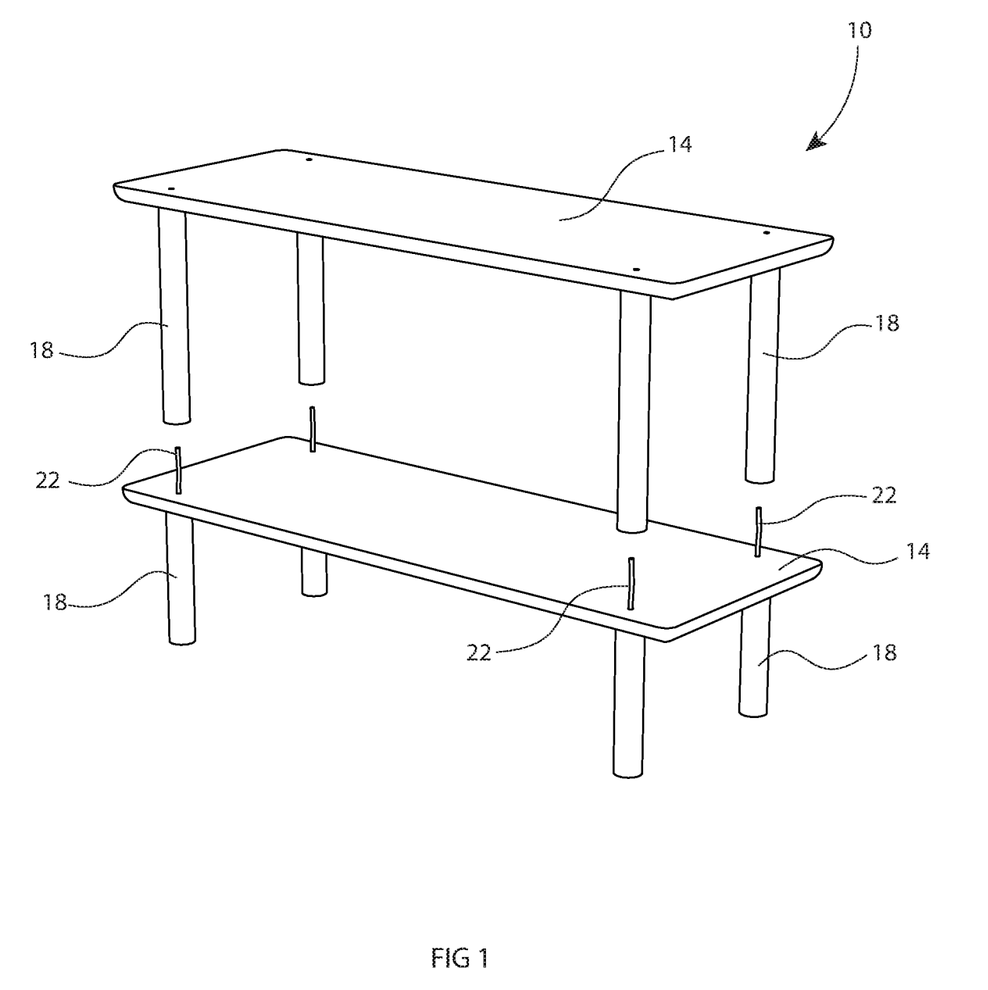
FIG. 1 is a drawing which shows a perspective view of a modular shelving system.

Turning now to FIG. 1, a perspective view of an example modular shelving system 10 is shown. The shelving system 10 includes multiple shelves 14 which are stacked on top of each other. Support posts 18 are attached underneath the lower shelf 14 and between the upper shelf 14 and the lower shelf 14. The support posts 18 separate each shelf 14 from the object beneath the shelf (e.g. another shelf 14, the floor, or another object such as a counter top). The support posts 18 can be made in different lengths to vary the spacing between shelves 14. The shelves 14 can be made in different lengths and widths as desired. The varied combinations of sizes for shelves 14 and support post 18 allow a user to customize the shelving system 10 as desired.

A shelf 14 with its support posts 18 is attached to the shelf 14 which is beneath it with attachment pins 22. The attachment pins 22 attach to the lower shelf 14 and are inserted into holes in the posts 18 for the upper shelf. The attachment pins 22 are formed so that the tops of the attachment pins 22 are a tight fit into the posts 18. The attachment pins 22 are bent so that the bent width of the pin 22 is wider than the hole in the post 18 and the pin is elastically unbent during insertion into the post 18 and maintains pressure on the post 18 while assembled. The attachment pins 22 are elongate, having a length which is typically at least about 5 times the diameter of the attachment pin, and more preferably having a length which is between about 10 and about 20 times the diameter of the attachment pin. Often, the attachment pin 22 has a length which is about 15 times its diameter. The attachment pins 22 allow a user to customize the shelf system without complex assembly or tools. The attachment pins 22 also eliminate a rigid order of assembly that would make it more difficult for a person to assemble or modify a shelving system to achieve a desired number and spacing of shelves 14.

The shelves 14 are typically made from wood. Birch plywood is a well suited material as it is attractive and provides good strength and durability to the shelves 14. The support posts 18 are also often made from wood as this provides a desirable look and feel to the shelving system 10.

Figure 2:
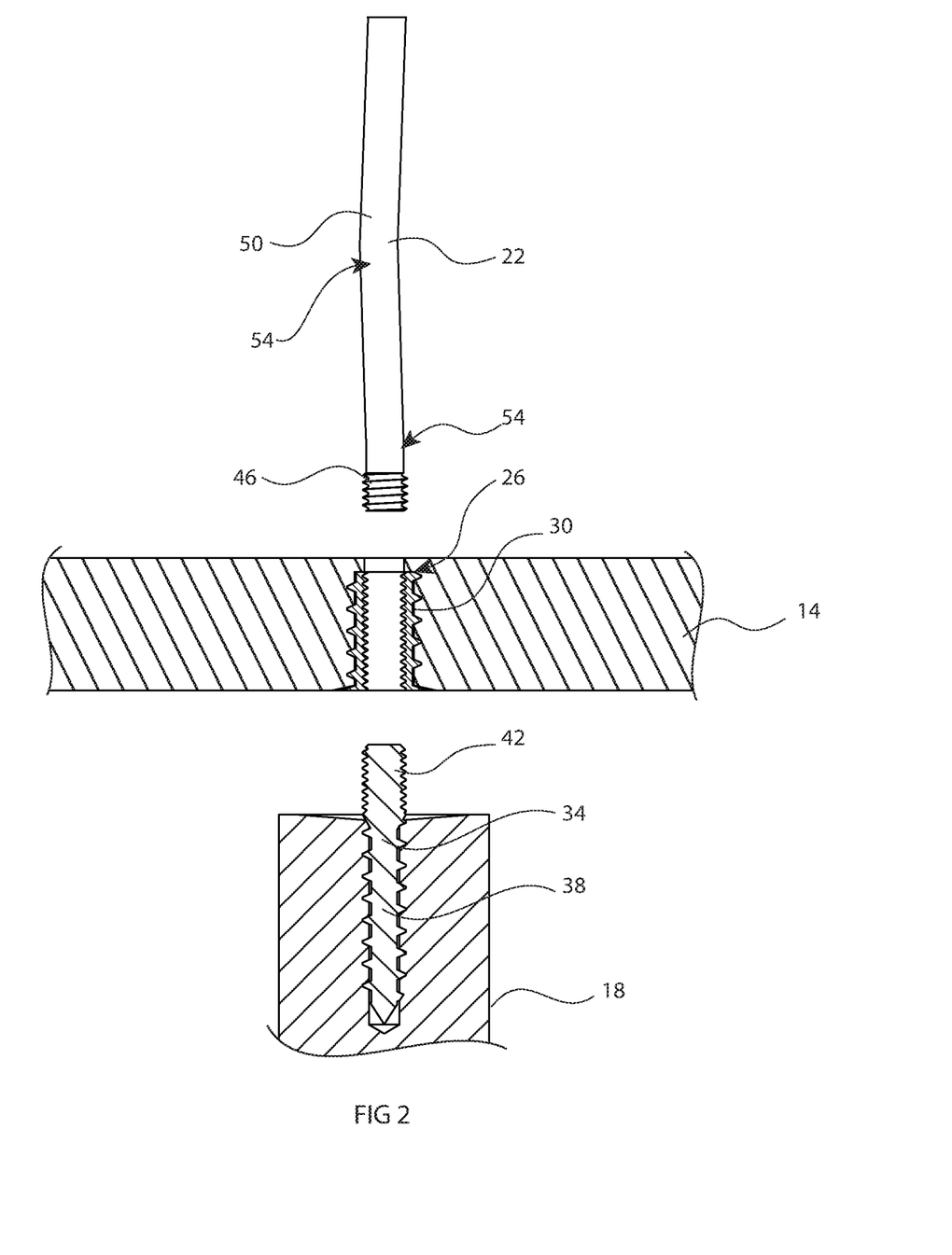
FIG. 2 is a drawing which shows a detailed view of a joint in the shelving system.
Figure 3:
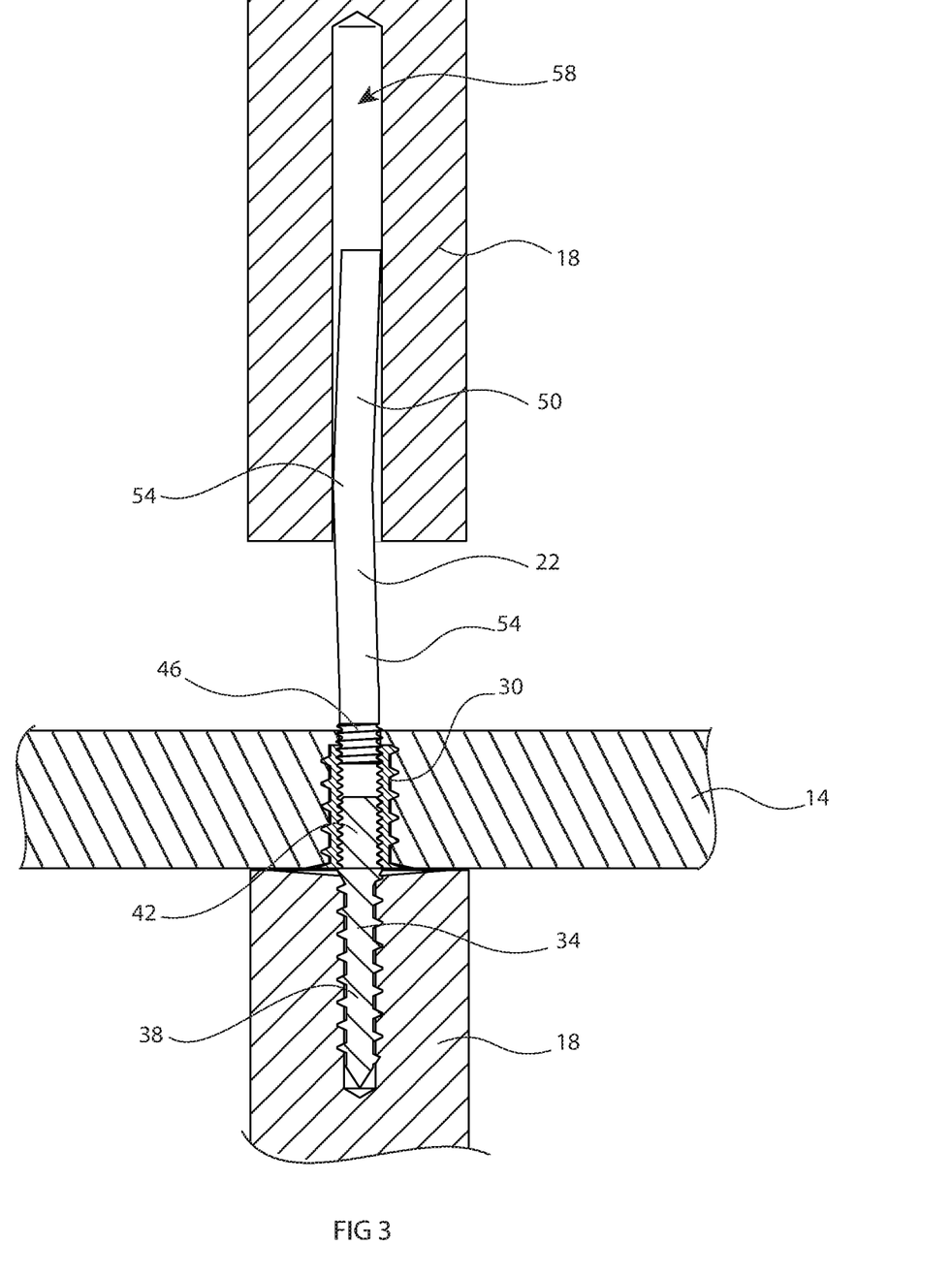
FIG. 3 is a drawing which shows a detailed view of a joint in the shelving system.
Figure 4:
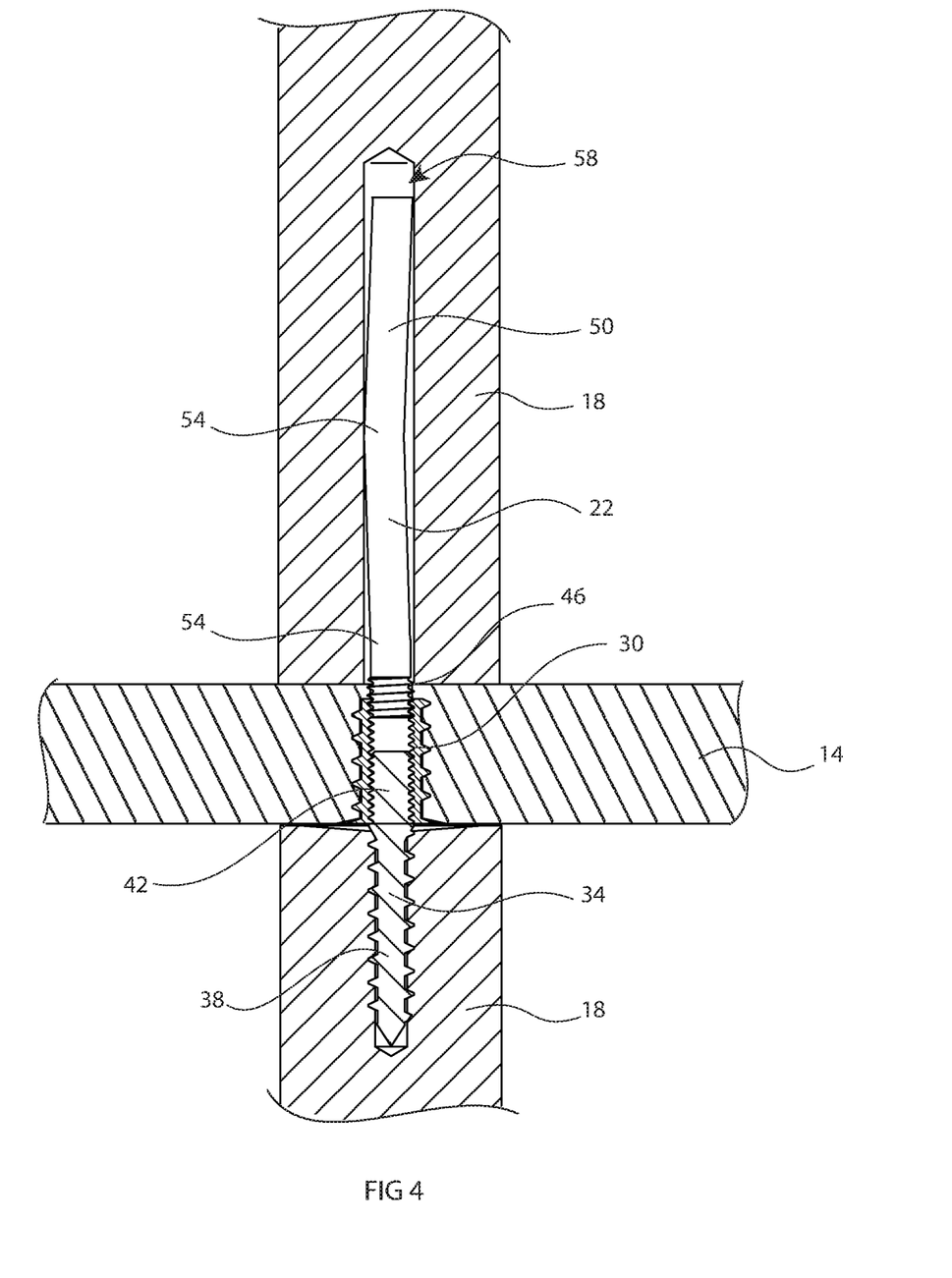
FIG. 4 is a drawing which shows a detailed view of a joint in the shelving system.

FIGS. 2, 3, and 4 show partial cross-sectional drawings of a joint between the support posts 18 and shelf 14. The shelf 14 includes holes 26 which are formed at each post attachment location. Typically, a shelf 14 has four post attachment locations. A shelf 14 may have additional post attachment locations if desired. A very wide shelf 14, for example, may have six post attachment locations with an additional set of post attachment holes 26 at the front and back of the middle of the shelf 14. Additional attachment locations in a shelf 14 may also allow a smaller shelf 14 to be attached to a larger shelf 14 to create a different style of shelving system 10.

A threaded insert 30 is attached to the shelf 14 in the attachment hole 26. The threaded insert 30 includes an internal bore with machine threads and external wood threads. Typically, the internal threads are a finer machine thread pitch to more easily interface with a machine thread on a metal screw and the external threads are coarser threads which have a stronger attachment to wood. As shown, the threaded insert 30 is screwed into the shelf 14. It is also possible to use a threaded insert 30 which is bonded or otherwise secured into the shelf 14. The example threaded insert 30 is screwed into the bottom of the shelf 14 as this results in the least visual disruption to the upper surface of the shelf 14. Typically, the shelf 14 is provided to a user with the threaded insert 30 installed. If desired, a shelving system 10 may include an upper shelf 14 where the attachment hole 26 is a blind hole that does not penetrate the upper surface of the shelf 14 to create a more visually appealing upper shelf 14.

The support post 18 includes a threaded anchor 34. The threaded anchor 34 includes a proximal (lower) section 38 that is attached to the support post 18 and a distal (upper) section 42 which is attachable to the threaded insert 30 to attach the support post 18 to the bottom of a shelf 14. The proximal section 38 of the threaded anchor 34 may be formed with a coarse thread for attaching the threaded anchor 34 to a wood support post 18. The distal section 42 of the threaded anchor 34 is formed with a thread which matches the internal thread of the threaded insert 30. In this example, the distal section 42 of the threaded anchor 34 is formed with a male machine thread to mate with the female machine thread of the threaded insert 30. The support posts 18 are typically provided to a user with threaded anchors 34 installed in their upper ends.

The attachment pin 22 is formed with a proximal (lower) threaded section 46 and a distal (upper) section 50. The threaded proximal section 46 is formed with a thread which matches the internal thread of the threaded insert 30. The length of the threaded proximal section 46 is often approximately equal to the diameter of the attachment pin 22, and may often be between about 1 times and about 2 times the diameter of the attachment pin 22. In this example, the proximal section 46 of the attachment pin 22 is formed with a male machine thread to mate with the female machine thread of the threaded insert 30. The distal section 50 of the attachment pin 22 is inserted into the bottom of a support post 18 to assemble the shelving system 10. The distal section 50 of the attachment pin 22 is formed so that it creates a friction fit into a hole in the support post 18. The example attachment pin 22 is formed with bends 54 that make the distal section 50 of the attachment pin 22 non-linear and wider than the material used to form the attachment pin. The bends 54 also make the straight-line overall width of the attachment pin 22 wider than the corresponding hole in the bottom of a support post 18. In other words, the overall width of the attachment pin 22 as viewed from the end of the attachment pin 22 is increased beyond the diameter of the material used to form the attachment pin 22 and is wider than the hole 58 into which the attachment pin 22 is inserted. The bends 54 are shown as angular bends and the resulting distal section 50 of the attachment pin 22 is angular. The bends 54 could be gradual bends and the resulting distal section 50 of the attachment pin 22 would curve back and forth.

As an example, the attachment pin 22 could be formed by rolling threads in a mild steel pin which is then bent to have a non-linear distal section 50. The round stock used to form the attachment pin 22 would have a diameter which is slightly less than the resulting diameter of the threads on the proximal section 46. The distal section 50 is bent so that it is wider overall than the hole 58 into which it is inserted. Inserting the distal section 50 of the attachment pin 22 into the hole 58 will elastically unbend the distal section 50 so that friction stabilizes the joint and prevents accidental disassembly of the joint. If the threaded proximal section 46 has 0.37 (⅜) inch coarse threads which are roll formed in a metal rod, the round metal rod used to form the attachment pin 22 would be approximately 0.33 inches in diameter. The bends 54 might make the distal section 50 of the attachment pin approximately 0.38 inches or 0.39 inches wide and the distal section 50 may be inserted into a 0.37 (⅜) inch hole 58 in the support post 18. It will also be appreciated that the threads may be made smaller than the diameter of the material used to make the attachment pin 22. Additionally, the attachment pin could be formed in the completed configuration shown instead of forming it in steps from metal rod, for example.

FIG. 3 shows the joint between the support posts 18 and the shelf 14 partially assembled. The distal (upper) section 42 of the threaded anchor 34 has been threaded into the threaded insert 30 to attach the support post 18 to the shelf 14. Typically, four such support posts 18 will be attached to a shelf to support the shelf 14. The number of support posts 18 attached to a shelf 14 may be varied according to the size of the shelf 14 and the desired appearance of the assembled shelf. The upper section 42 of the threaded anchor 34 is threaded into the threaded insert 30 until the support post 18 is drawn snugly against the bottom of the shelf 14 so the support post 18 is securely attached to the shelf 14.

Another (upper) support post 18 can be attached to the shelf 14 above the threaded insert 30. The upper support post 18 will support another shelf 14 above the illustrated shelf 14. The upper end of the upper support post 18 is attached to the upper shelf (not illustrated) in the same manner as shown and described. The lower ends of the support posts 18 are formed with a hole 58. The hole 58 is larger in diameter than the metal rod used to form the attachment pin 22 and is longer than the length of the distal section 50 of the attachment pin 22. This allows the distal section 50 of the attachment pin 22 to be inserted into the hole 58 with contacting the end of the hole 58. The diameter of the hole 58 is less than the overall width of the attachment pin 22 as caused by the bends 54 in the attachment pin 22. The attachment pin 22 thus contacts the sides of the hole 58 when the distal (upper) section 50 of the attachment pin 22 is inserted into the hole 58.

Typically, the attachment pin 22 will contact opposing sides of the hole 58. As the attachment pin 22 is inserted into the hole 58, the distal section 50 of the attachment pin 22 is elastically bent into a straighter configuration by contact with the walls of the hole 58. Typically, the bends 54 in the attachment pin 22 are elastically unbent to a degree and the sections of the attachment pin 22 around the bends 54 are elastically bent to allow the distal section 50 of the attachment pin 22 to be inserted into the hole 58. The attachment pin 22 remains elastically bent while in the hole 58 and exerts a force against the walls of the hole 58. This causes friction between the attachment pin 22 and the hole 58 and also stabilizes the attachment pin 22 in the hole 58 so that it is not loose in the hole 58.

The amount of interference between the overall width of the bent distal section 50 of the attachment pin 22 and the diameter of the hole 58 may be varied. Too much interference results in a large amount of force between the attachment pin 22 and the hole 58 and may make the shelving system 10 unnecessarily difficult to assemble or disassemble. The amount of interference between the attachment pin 22 and the hole 58 and the resulting amount of elastic bending of the inserted attachment pin 22 need not be overly high because gravity helps to keep the shelving system 10 in the assembled configuration. Often, the sliding friction between the attachment pin 22 and the hole 58 need only be about 1 pound force. The contact between the attachment pin 22 and the hole 58 stabilizes the shelves 14 and prevents undesirable looseness or wobbling of the shelving system 10. The overall width of the distal section 50 of the attachment pin 22 is often between about 0.01 inch and 0.03 inch larger than the diameter of the hole 58. This difference in width between the attachment pin 22 and the hole 58 would vary based on the length and size of the attachment pin 22 and the material used to make the attachment pin 22.

FIG. 4 shows the assembled joint between a lower support post 18, shelf 14, and an upper support post 18. The upper support post 18 has been attached to the lower shelf 14 by inserting the attachment pin 22 into the hole 58 and sliding the support post 18 downwardly until it contacts the shelf 14. This elastically bends the attachment pin 22 and causes the attachment pin 22 to press against the sides of the hole 58. The hole 58 is deeper than length of the distal section 50 of the attachment pin 22 so that there is a small space above the attachment pin 22 in the hole 58. This prevents the attachment pin 22 from bottoming out in the hole 58 as this may prevent the support post 18 from contacting the top of the shelf 14.

FIG. 1 further illustrates the assembly of the shelving system 10. In order to assemble a shelving system 10 with multiple shelves 14, a lower shelf 14 is selected. Support posts 18 are selected for the lower shelf 14. As shown, support posts 18 may be provided in different lengths and a user may select a desired length according to the position and size of the shelf 14. Each of the support posts 18 is attached to the lower shelf 14 by screwing the upper section 42 of the threaded anchor 34 into the lower opening of a threaded insert 30. The lower shelf 14 may then be placed in a desired location resting on top of support posts 18. Attachment pins 22 may then be attached to the shelf 14 by threading the lower section 46 of each attachment pin 22 into the upper opening of each threaded insert 30. The lower shelf 14 is now in the configuration shown in FIG. 1 with attachment pins 22 extending upwardly from the top of the lower shelf 14.

An upper shelf 14 is prepared by attaching support posts 18 to the upper shelf 14. Support posts 18 may be selected according to a desired spacing between the upper shelf 14 and the lower shelf 14. Each of the support posts 18 is attached to the upper shelf 14 by screwing the upper section 42 of the threaded anchor 34 into the lower opening of a threaded insert 30 in the upper shelf 14. The upper shelf 14 is then attached to the lower shelf 14 by attaching the upper support posts 18 to the attachment pins 22. The holes 58 in the upper support posts 18 are aligned with the attachment pins 22 and the upper support posts 18 are moved downwardly over the attachment pins 22. The attachment pins are bent elastically in order to move into the holes 58. The attachment pins remain elastically bent while the joint between a lower shelf 14 and upper support post 18 is in an assembled configuration. This stabilizes the shelving system 10.

The shelving system 10 allows multiple shelves 14 to be securely stacked on top of each other without slop or looseness between shelves. The attachment pins 22 securely locate a shelf 14 in the desired position on top of another shelf 14 and prevent a shelf from sliding sideways. Multiple shelves 14 can be assembled and stacked on top of each other in a stable and secure configuration without requiring the use of any tools. The shelves 14 can also be disassembled without requiring the use of any tools. Multiple stacked shelves 14 are not likely to be accidentally disassembled due to the forces required to pull them apart. The shelving system 10 can be shipped and stored in a compact space.

Figure 5:
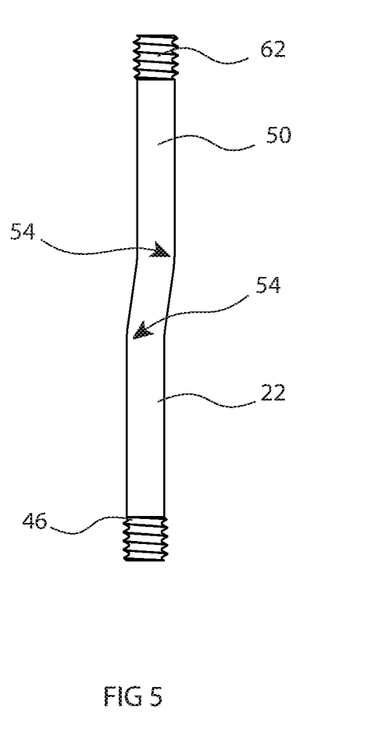
FIG. 5 is a drawing which shows an alternate attachment pin.

FIG. 5 shows an alternate attachment pin 22. This attachment pin 22 is similar to the attachment pin 22 described above and includes a proximal section 46 with threads and a distal section 50 with bends 54. The bends 54 result in the distal section 50 having an overall width (a maximum width measured along its length) which is wider than the material used to make the attachment pin 22. This results in the attachment pin 22 being wider than the hole 58 in the support post 18 so that the attachment pin 22 is maintained elastically bent while the shelving system 10 is in an assembled configuration as discussed above. The distal section 50 of the attachment pin 22 includes threads 62 so that the attachment pin 22 is reversible. Either threaded end could be attached to the threaded insert 30. It will also be appreciated that the threads could be smaller than the diameter of the rod used to make the attachment pin 22.

Figure 6:
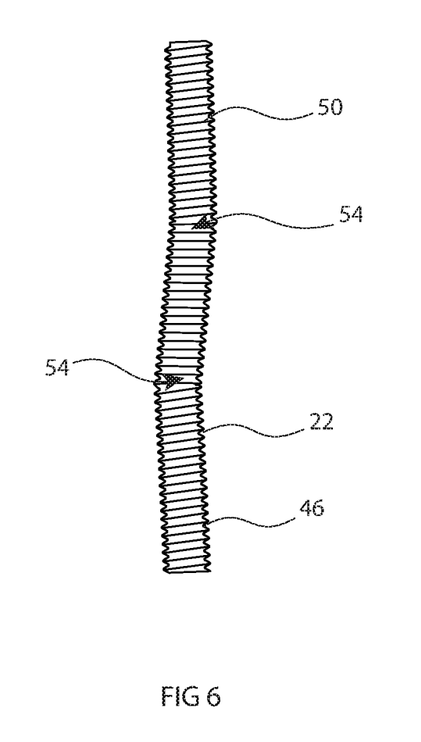
FIG. 6 is a drawing which shows an alternate attachment pin.

FIG. 6 shows an alternate attachment pin 22. This attachment pin 22 is similar to the attachment pin 22 described above and is made from a threaded rod. The attachment pin 22 includes a proximal section 46 with threads and a distal section 50 with bends 54. The bends 54 result in the distal section 50 having an overall width (a maximum width measured along its length) which is wider than the material used to make the attachment pin 22. This results in the attachment pin 22 being wider than the hole 58 in the support post 18 so that the attachment pin 22 is maintained elastically bent while the shelving system 10 is in an assembled configuration as discussed above. The distal section 50 of the attachment pin 22 includes threads 62 so that the attachment pin 22 is reversible. Either end of the attachment pin 22 could be attached to the threaded insert 30.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. An article of modular furniture comprising:
   a lower shelf;
   a plurality of lower support posts attached to a bottom of the lower shelf to support the lower shelf;
   an upper shelf;
   a plurality of upper support posts attached to the bottom of the upper shelf to support the upper shelf;
   wherein the plurality of upper support posts are disposed on top of the lower shelf to support the upper shelf above the lower shelf; and
   a joint between the lower shelf and the upper shelf comprising:
   a threaded opening in the lower shelf;
   an attachment pin comprising a threaded lower section, an upper section, and wherein the upper section of the attachment pin is bent such that an overall width of the attachment pin is greater than a cross-sectional width of the material used to make the attachment pin;
   wherein the threaded lower section of the attachment pin engages the threaded opening in the lower shelf such that the attachment pin extends upwardly from the lower shelf;
   wherein one of said upper support posts comprises a hole formed in a lower end which extends upwardly into the upper support post;
   wherein the upper support post is disposed on the lower shelf such that the attachment pin is located in the upper support post hole; and
   wherein the overall width of the attachment pin is greater than a width of the upper support post hole such that the attachment pin is bent elastically while in an assembled configuration.

2. The article of modular furniture of claim 1, wherein the lower shelf threaded opening extends through the lower shelf, wherein one of said lower support posts comprises a threaded anchor having an upper threaded section extending upwardly from the lower support post, and wherein the upper threaded section engages the lower shelf threaded opening to attach the lower support post to the bottom of the lower shelf.

3. The article of module furniture of claim 2, wherein the threaded anchor comprises a lower threaded section which is attached to the lower support post and an upper threaded section which extends from the lower support post.

4. The article of modular furniture of claim 1, wherein the lower shelf threaded opening is formed by a threaded insert comprising an outer thread which attaches the threaded insert to the lower shelf and an inner thread which forms the lower shelf threaded opening.

5. The article of furniture of claim 1, wherein the attachment pin comprises an elongate rod having a length which is at least about 5 times a diameter of the attachment pin, and wherein the upper section of the attachment pin comprises a majority of the length of the elongate rod.

6. The article of furniture of claim 5, wherein the attachment pin has a length which is about 15 times the diameter of the attachment pin.

7. The article of furniture of claim 1, wherein the upper section of the attachment pin comprises two bends such that the upper section of the attachment pin is non-linear and has an overall width greater than a width of the material used to form the attachment pin.

8. An article of furniture comprising:
   a generally horizontal lower shelf;
   a generally horizontal upper shelf disposed above the lower shelf;
   an upper support post which is attached to the upper shelf to support the upper shelf above the lower shelf;
   an attachment pin comprising a lower section which is attached to the lower shelf and an upper section which extends above the lower shelf;
   wherein the upper section of the attachment pin is bent such that the upper section of the attachment pin is non-linear and such that an overall width of the upper section of the attachment pin is greater than a cross-sectional width of the material used to make the attachment pin;
   wherein the upper support post comprises a hole formed in a lower end which extends upwardly into the upper support post;
   wherein the upper support post is disposed on the lower shelf such that the upper section of the attachment pin is located in the upper support post hole; and
   wherein the overall width of the attachment pin is greater than a width of the upper support post hole such that the attachment pin is bent elastically while in an assembled configuration.

9. The article of furniture of claim 8, further comprising a threaded opening in the lower shelf, and wherein the lower section of the attachment pin is threaded and engages the threaded opening in the lower shelf to attach the attachment pin to the lower shelf whereby the upper section of the attachment pin extends upwardly from the lower shelf.

10. The article of modular furniture of claim 9, wherein the lower shelf threaded opening extends through the lower shelf, and further comprising a lower support post comprising a threaded anchor having an upper threaded section extending upwardly from the lower support post, and wherein the upper threaded section engages the lower shelf threaded opening to attach the lower support post to the bottom of the lower shelf.

11. The article of module furniture of claim 10, wherein the threaded anchor comprises a lower threaded section which is attached to the lower support post and an upper threaded section which extends from the lower support post.

12. The article of modular furniture of claim 9, wherein the lower shelf threaded opening is formed by a threaded insert comprising an outer thread which attaches the threaded insert to the lower shelf and an inner thread which forms the lower shelf threaded opening.

13. The article of furniture of claim 8, wherein the upper section of the attachment pin comprises two bends such that the upper section of the attachment pin is non-linear and has an overall width greater than a width of the material used to form the attachment pin.

14. An article of furniture comprising:
a first generally horizontal shelf;
a second generally horizontal shelf which is vertically offset from the first shelf;
a first support having a first end which is attached to the first shelf and a second end having a hole formed therein extending into the support;
an attachment pin comprising a proximal section which is attached to the second shelf and a distal section which extends from the second shelf;
wherein the distal section of the attachment pin is bent such that the distal section of the attachment pin is non-linear and such that an overall width of the distal section of the attachment pin is greater than a cross-sectional width of the material used to make the attachment pin;
wherein the first support is attached to the second shelf such that the distal section of the attachment pin is located in the hole in the first support; and
wherein the overall width of the attachment pin is greater than a width of the hole in the first support such that the attachment pin is bent elastically while disposed in the hole in the first support.

15. The article of furniture of claim 14, further comprising a threaded opening in the second shelf, and wherein the proximal section of the attachment pin is threaded and engages the threaded opening in the second shelf to attach the attachment pin to the second shelf whereby the distal section of the attachment pin extends from the second shelf.

16. The article of modular furniture of claim 15, wherein the second shelf threaded opening extends through the second shelf, and further comprising a second support comprising a threaded anchor having an threaded section extending from an end of the second support, and wherein the threaded section engages the second shelf threaded opening to attach the second support to the second shelf on a side opposite the first support.

17. The article of module furniture of claim 16, wherein the threaded anchor comprises a proximal threaded section which is attached to the second support and a distal threaded section which extends from the second support.

18. The article of modular furniture of claim 15, wherein the threaded opening in the second shelf is formed by a threaded insert comprising an outer thread which attaches the threaded insert to the second shelf and an inner thread which forms the threaded opening.

19. The article of furniture of claim 14, wherein the distal section of the attachment pin comprises two bends such that the distal section of the attachment pin is non-linear and has an overall width greater than a width of the material used to form the attachment pin.

20. An article of furniture comprising:
a first panel;
a threaded opening in the first panel;
a first support which is attached to the first panel, the first support comprising a hole formed therein extending into the first support;
an attachment pin comprising a threaded proximal section which is disposed in and engages the threaded opening in the first panel to attach the attachment pin to the first panel and a distal section which extends from the first panel;
wherein the distal section of the attachment pin comprises a non-linear shape such that an overall width of the distal section of the attachment pin is greater than a cross-sectional width of the material forming the attachment pin;
wherein the first support is attached to the first panel with the attachment pin such that the distal section of the attachment pin is located in the hole in the first support; and
wherein the overall width of the attachment pin is greater than a width of the hole in the first support such that the attachment pin is bent elastically while disposed in the hole in the first support.

21. The article of furniture of claim 20, wherein the distal section of the attachment pin is bent such that the distal section of the attachment pin is non-linear and has an overall width greater than a width of the material used to form the attachment pin.

22. The article of furniture of claim 21, wherein the distal section of the attachment pin has a circular cross section with a diameter which is less than a diameter of the first support hole.

23. The article of furniture of claim 20, wherein the first panel is disposed horizontally and wherein the first support comprises a vertical support.

24. The article of modular furniture of claim 20, wherein the first support is attached to a first side of the first panel, wherein the threaded opening extends through the first panel, and further comprising a second support comprising a threaded anchor having an threaded section extending from an end of the second support, and wherein the threaded section engages the first panel threaded opening to attach the second support to the first panel on a second side of the first panel.

* * * * *